(No Model.)
C. BURNS.
VEHICLE AXLE.
No. 525,257. Patented Aug. 28, 1894.
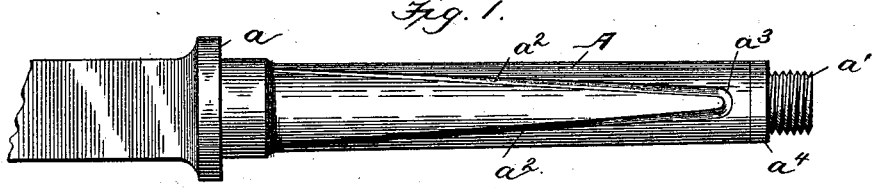
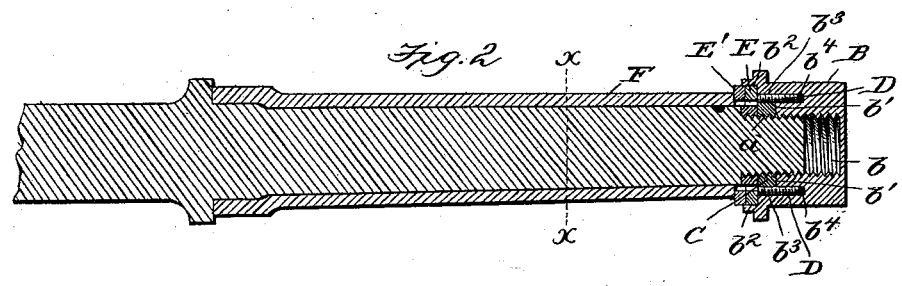
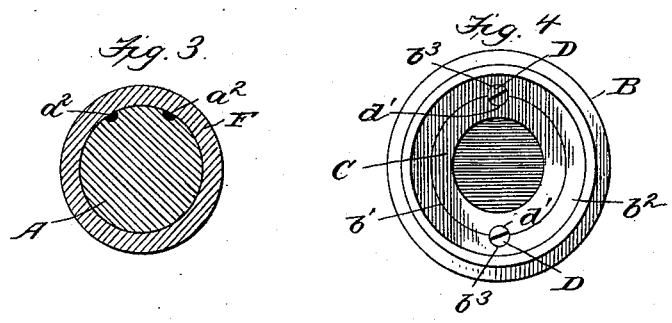
Witnesses
Edwin L. Bradford
Rudolph B. Schwickardi
Inventor
Cornelius Burns
By
Patrick O'Farrell
Attorney

UNITED STATES PATENT OFFICE.

CORNELIUS BURNS, OF BURNSIDE, PENNSYLVANIA.

VEHICLE-AXLE.

SPECIFICATION forming part of Letters Patent No. 525,257, dated August 28, 1894.

Application filed November 14, 1893. Serial No. 490,938. (No model.)

*To all whom it may concern:*

Be it known that I, CORNELIUS BURNS, a citizen of the United States of America, residing at Burnside, in the county of Clearfield and State of Pennsylvania, have invented certain new and useful Improvements in Vehicle-Axles, of which the following is a specification, reference being had therein to the accompanying drawings.

This invention contemplates certain new and useful improvements in vehicle axles and it has for its objects, first, to provide means for confining the oil or lubricant in the boxing of the wheel-hub and properly distributing the same, and second, to prevent rattling of the wheel and compensate for wear.

The invention consists of an axle-skein having a threaded end, a nut designed to screw on said end, and a series of thimbles or washers, one of said thimbles being removably secured to said nut.

The invention further comprises the details of construction, combination and arrangement of parts, substantially as hereinafter fully set forth and particularly pointed out in the claims.

In the accompanying drawings:—Figure 1 is a plan view of one end of an axle provided with my improvements. Fig. 2 is a vertical longitudinal sectional view with the boxing of a wheel-hub in position. Fig. 3 is a transverse sectional view on the line $x-x$, Fig. 2. Fig. 4 is an end-view of the nut detached.

Referring to the drawings, A designates an axle-skein formed of metal and at its inner end having a collar $a$, its outer reduced end $a'$, being threaded. In the top of this skein is a continuous groove $a^2$ which is extended in the form of a "V," that is, the groove extends diagonally from the inner end of the skein to near the outer end thereof, as at $a^3$, where it is curved and then extends diagonally inward, its other end being adjacent to the inner end of the skein. The oil or lubricant is designed to rest in this continuous groove. Upon the threaded end $a'$ of the skein is secured a thimble $a^4$ which conforms to the outer end of the skein proper.

B is a nut closed at its outer end and having an inner female thread $b$ and two inner recesses $b'$, $b^2$. In the wall of the former recess $b'$, are formed two threaded semi-circular recesses $b^3$ which are coincident with two threaded holes $b^4$ in the body of the nut. In this recess $b'$ is designed to fit a thimble C having a central opening provided with a female thread $d$ corresponding to thread $b$. In the periphery of this thimble C are two opposite threaded recesses $d'$ which are designed to coincide with threaded recesses $b^3$, the same conjunctively forming circular holes in which screws D are designed to work, the ends of said screws being extended into threaded holes $b^4$ and thus thimble C is held firm within nut B. Two leather washers E, E', are designed to be placed between nut B and the boxing F of the vehicle-hub, not shown, one of said washers fitting within the recess $b^2$ of said nut. In practice, when the hub of the wheel becomes worn by friction first one and then the other leather washer is removed and then later on the thimble $a^4$ is taken off and finally the thimble C carried by nut D. To remove this latter thimble it is only necessary to unscrew screws D. In this way compensation is had for all wear of the wheel hub and the latter can always be held tight on the axle-skein.

The advantages of my improvements are apparent to those skilled in the art to which it appertains and it will be specially observed that the same are simple and inexpensive and that the parts can be readily and easily operated.

I claim as my invention—

1. The combination with the axle-skein having a reduced threaded end, of a nut having an inner female thread and a thimble carried by said nut and provided with coincident female threaded openings, and means for removably connecting said thimble direct to said nut, substantially as set forth.

2. The combination with the axle-skein having a reduced threaded end, of a nut having an inner female thread and threaded holes or recesses, a thimble having a threaded opening and side recesses and fitted in said nut, and screws designed to work in said recesses and hold said thimble in said nut, as set forth.

3. The combination with the axle-skein having a reduced threaded end, of a thimble, as $a^4$, fitted on said end, and a nut carrying an inner thimble, as C, and also designed to fit on said threaded end, and means for removably connecting said latter thimble to said nut, substantially as set forth.

4. The combination with the skein having a threaded end of a thimble fitted thereon, a nut having inner recesses, a thimble in one of said recesses, holding screws therefor, and washers, one of which fits in one of said recesses of said nut, substantially as set forth.

In testimony whereof I affix my signature in presence of two witnesses.

CORNELIUS BURNS.

Witnesses:
ROBERT BRYSON,
W. T. HOLMES.